United States Patent
Okazaki et al.

(10) Patent No.: US 6,936,184 B2
(45) Date of Patent: *Aug. 30, 2005

(54) CONDUCTIVE MEMBER FOR OA EQUIPMENT

(75) Inventors: Takahiko Okazaki, Kobe (JP); Makoto Hasegawa, Kobe (JP); Takashi Miki, Kobe (JP); Takayuki Nagase, Kobe (JP); Hiroyuki Inai, Kobe (JP)

(73) Assignee: Bando Chemical Industries, Ltd., Hyogo-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/475,202

(22) PCT Filed: Apr. 22, 2002

(86) PCT No.: PCT/JP02/03979

§ 371 (c)(1),
(2), (4) Date: Dec. 16, 2003

(87) PCT Pub. No.: WO02/088251

PCT Pub. Date: Nov. 7, 2002

(65) Prior Publication Data

US 2004/0191526 A1 Sep. 30, 2004

(30) Foreign Application Priority Data

Apr. 20, 2001 (JP) ........................................ 2001-123228

(51) Int. Cl.$^7$ .................................................. F16L 1/00
(52) U.S. Cl. .............................. 252/182.22; 252/182.3; 428/35.7; 428/423.1
(58) Field of Search .......................... 252/182.22, 182.3; 428/35.7, 423.1; 174/110 AR, 110 AS

(56) References Cited

U.S. PATENT DOCUMENTS 6,140,405 A 10/2000 Eckstein et al.

FOREIGN PATENT DOCUMENTS

| JP | 06035298 A | * 2/1994 | .......... G03G/15/02 |
|----|------------|----------|----------------------|
| JP | 2002-146178 | 5/2002 | |
| JP | 2002-317114 | 10/2002 | |
| WO | WO 01/793584 | 10/2001 | |

OTHER PUBLICATIONS

May 1, 1995 The Role of Lithium Salts in the Conductivity and Phase Morphology of a Thermoplastic Polyurethane J.D. van Heuman et al. Macromolecules vol. 28, No. 12 pp. 4268–4277.

* cited by examiner

*Primary Examiner*—Sandra Nolan Rayford
(74) *Attorney, Agent, or Firm*—Jordan and Hamburg LLP

(57) ABSTRACT

A conductive member for OA equipment (electrophotographic apparatus or electrostatic recording apparatus) which is obtainable from a composition comprising a non-ether-based polyurethane, carbon black and bis(trifluoromethanesulfonyl)imidolithium. The conductive member shows very stable conductivity in the volume resistivity range of $10^5$ to $10^{12}$ Ω·cm, the conductivity of which is less dependent on the voltage applied and varies only slightly during continuous energization and upon changes in environmental factors such as temperature and humidity.

16 Claims, No Drawings

CONDUCTIVE MEMBER FOR OA EQUIPMENT

TECHNICAL FIELD

The present invention relates to conductive members for OA equipment which are suitable for blades, rollers and belts for charging, developing, transfer, fixation, static electricity elimination, cleaning, paper feeding or transportation in electrophotographic apparatus and electrostatic recording apparatus such as copiers, facsimile equipment and printers.

BACKGROUND ART

OA equipment including electrophotographic apparatus and electrostatic recording apparatus such as copiers, facsimile equipment, printers are constituted of various parts, and blades, rollers and belts are essential parts playing such a roll as charging, developing, transfer, fixation, static electricity elimination, cleaning, paper feeding or transportation in electrophotographic processes. These parts are mostly made of polyurethane materials and, in many cases, they must be provided with a conductivity of about $10^4$ to $10^{12}$ $\Omega \cdot cm$ from the functional viewpoint.

The most popular measures that has so far been taken for providing polyurethane members for OA equipment parts with conductivity comprises molding a polyurethane material prepared by kneading and dispersing carbon black with and in the polyol constituent, for instance.

However, it is very difficult to provide such moldings wholly and uniformly with stable conductivity by the method comprising dispersing, by kneading, of carbon black, since a slight deviation in the amount of addition of such a substance, slight changes in such conditions as material temperature, molding temperature and molding time and, further, the use of a different molding method result in changes in conductive path morphology, hence in great variations in conductivity, in particular in the volume resistivity range of $10^6$ to $10^{11}$ $\Omega \cdot cm$.

Furthermore, carbon black is generally higher in specific gravity than polyurethanes, so that it settles and is distributed unevenly during molding and, further according to the moldings morphology, leading to development of faults in conductive paths of carbon black and making it difficult to stably provide the moldings with uniform conductivity. This tendency is strong especially with the moldings molded by the centrifugal molding method in which a great centrifugal force is exerted on the materials. Therefore, to cope with such difficulties, it is indispensable to strictly control the manufacturing conditions according to the moldings morphology and/or molding method. Moreover, with the conductive polyurethanes obtained by such methods, the electric resistance is highly dependent on the voltage applied, hindering the development of high-performance electrophotographic apparatus and electrostatic recording apparatus.

SUMMARY OF THE INVENTION

In view of the foregoing, it is an object of the present invention to provide a conductive member for OA equipment which shows very stable conductivity in the volume resistivity range of $10^5$ to $10^{12}$ $\Omega \cdot cm$, the conductivity of which is less dependent on the voltage applied and varies only slightly during continuous energization and upon changes in environmental factors such as temperature and humidity.

The present invention is a conductive member for OA equipment, which is obtainable by molding a composition comprising a non-ether-based polyurethane, carbon black and bis(trifluoromethanesulfonyl)imidolithium.

The conductive member for OA equipment according to the present invention, which is a conductive blade, a conductive roller or a conductive belt also constitutes an aspect of the present invention also constitutes an aspect of the present invention.

DETAILED DISCLOSURE OF THE INVENTION

In the following, the present invention is described in detail.

The present invention is concerned with a conductive member for OA equipment, which is obtainable by molding a composition comprising a non-ether-based polyurethane, carbon black and bis(trifluoromethanesulfonyl) imidolithium.

As a result of intensive investigations made by them to accomplish the above-mentioned object, the present inventors found that non-ether-based polyurethanes containing carbon black and bis(trifluoromethanesulfonyl)imidolithium combinedly used as conductive agents show very stable electric resistance in the volume resistivity range of $10^5$ to $10^{12}$ $\Omega \cdot cm$ and their conductivity does not greatly depend on the voltage. These findings have now led to completion of the present invention.

The composition to be used the present invention comprises a non-ether-based polyurethane, carbon black and bis(trifluoromethanesulfonyl)imidolithium. The term "non-ether-based polyurethane" as used herein means the product of the reaction between a non-ether-based polyol and a polyisocyanate.

The above non-ether-based polyol includes, for example, condensation polymer type polyester polyols such as typically poly(ethylene adipate) polyol, poly(butylene adipate) polyol, and poly(ethylene butylene adipate) polyol; lactone-derived polyester polyols such as typically poly (caprolactone) polyol and poly(β-methyl-γ-valerolactone) polyol; olefin-derived polyols such as typically poly (isoprene) polyol and poly(butadiene) polyol; poly (carbonate) polyols, castor oil-based polyols, acrylic polyols, dimer acid polyols, silicone-based polyols, fluorine-containing polyols, etc.

Incidentally, ether type polyols such as typically polyethylene glycol and poly(oxytetramethylene) glycol, are highly hygroscopic and increase the environment dependency of the conductivity, hence are unsuited for use in producing conductive members for OA equipment according to the present invention.

The above-mentioned polyisocyanate is not particularly restricted but includes, for example, tolylene diisocyanate (TDI), 4,4'-diphenylmethanediisocyanate (MDI), liquid MDI, xylylene diisocyanate (XDI), naphthylene-1,5-diisocyanate (NDI), hexamethylene diisocyanate (HDI), hydrogenated TDI, hydrogenated MDI, isophoronediisocyanate (IPDI), lysinediisocyanate (LDI), isopropylidenebis (4-cyclohexyl isocyanate), norbornanediisocyanate and the like.

In reacting the above non-ether-based polyol with the above polyisocyanate, a curing agent may be added.

The curing agent is not particularly restricted but includes, for example, aliphatic, aromatic, alicyclic and heterocyclic low-molecular-weight glycols; triols such as trimethylolpropane and glycerin; polyhydric alcohols such as pentaerythritol and sorbitol; and amine compounds, typically methylenebis-o-chloroaniline (MOCA).

The feature of the present invention comprises in using carbon black and bis(trifluoromethanesulfonyl)imidolithium represented by the formula shown below combinedly as conductive agents.

The above-mentioned carbon black is not particularly restricted but includes, for example, furnace black species such as typically Ketjen black EC and Valcan XC-72; acetylene black, acidic carbon black, and grafted carbon species resulting from grafting of a polymer on the carbon particle surface. These species may be used singly or two or more of them may be used in combination.

In the present invention, carbon black is dispersed in a polyol by kneading. The amount of carbon black to be dispersed in the polyol by kneading is preferably at most 10% by weight based on the whole composition. When it exceeds 10% by weight, the viscosity of the polyol becomes markedly high, making it difficult to conduct the molding and/or dehydration and defoaming procedure.

In accordance with the present invention, bis(trifluoromethanesulfonyl)imidolithium is used as a conductive agent in addition to carbon black. Bis(trifluoromethanesulfonyl)imidolithium is preferably used in an amount within the range of 0.01 to 200% by weight relative to the amount of carbon black used in combination. When it is less than 0.01% by weight, the stability of conductivity will be impaired and the variation in electric resistance value will increase. On the other hand, when it exceeds 200% by weight, no more improvement in resistance stability will be produced.

In accordance with the present invention, it has been so designed that even when defects are produced in electronically conductive paths of the conductive substance carbon black, the ionic conductive substance bis(trifluoromethanesulfonyl)imidolithium can complement them. Therefore, it is possible to provide the moldings with a desired level of conductivity, irrespective of molding method and without strictly controlling the manufacturing conditions.

The conductive member for OA equipment according to the present invention is molded from the above-mentioned composition.

The above-mentioned composition comprises a non-ether-based polyurethane and bis(trifluoromethanesulfonyl)imidolithium and preferably essentially consists of a non-ether-based polyurethane and bis(trifluoromethanesulfonyl)imidolithium.

In molding the above composition to obtain the conductive member for OA equipment, a catalyst may be added to the above composition for promoting the curing reaction.

The catalyst is not particularly restricted but may be any of the substances promoting the urethane formation reaction. Thus, such catalysts as amine compounds and organometallic compounds, which are generally used in urethane formation, can be used.

The method for molding of the conductive member for OA equipment is not particularly restricted but includes, for example, ordinary pressure casting molding, reduced pressure casting molding, centrifugal molding, rotational molding, extrusion molding, injection molding, reaction injection molding (RIM), and spin coating.

The conductive member for OA equipment according to the present invention may serve as any conductive member to be used in OA equipment, without any particular restriction. As such member, there may be mentioned, for example, conductive blades, conductive rollers, conductive belts and the like. Such a conductive blade, conductive roller or conductive belt also constitutes an aspect of the present invention.

BEST MODE FOR CARRYING OUT THE INVENTION

The present invention will be described in more detail by way of examples, but the present invention is not restricted only to these examples.

EXAMPLE 1

Poly(ethylene butylene adipate) polyol having an average molecular weight of 2,000 and a number of functional groups of 2 and containing a conductive carbon black species (Ketjen black ECP) dispersed therein by kneading as dehydrated and defoamed as a whole by warming under reduced pressure, a prepolymer prepared by reacting poly(ethylene butylene adipate) polyol having an average molecular weight of 2,000 and a number of functional groups of 2 with MDI to attain an NCO content of 16%, and a curing agent comprising a mixture of 1,4-butanediol and trimethylolpropane in a weight ratio of 7:3 and containing bis(trifluoromethanesulfonyl)imidolithium dissolved therein in advance were weighed in respective amounts such that the ratio: number of moles of the hydroxyl group in the poly(ethylene butylenes adipate) polyol with carbon black dispersed therein/number of moles of the isocyanato group in the prepolymer/number of moles of the hydroxyl group in the curing agent amounted to 1:2.7:1.6 and, after mixing up of these with stirring, the mixture was cured in a centrifugal molding machine at 130° C. for about 1 hour. Then, the molding was taken out of the centrifugal molding machine and matured at room temperature for 12 hours to give a sheet-like sample with a thickness of 2 mm. The amount of addition of bis(trifluoromethanesulfonyl)imidolithium was 70% by weight relative to that of carbon black.

EXAMPLE 2

A sample was prepared in the same manner as in Example 1 except that the amount of addition of bis(trifluoromethanesulfonyl)imidolithium was 145% by weight relative to that of carbon black.

EXAMPLE 3

A sample was prepared in the same manner as in Example 1 except that the amount of addition of bis(trifluoromethanesulfonyl)imidolithium was 0.2% by weight relative to that of carbon black.

EXAMPLE 4

Poly(ethylene butylene adipate) polyol having an average molecular weight of 2,000 and a number of functional groups of 2 and containing a conductive carbon black species (Ketjen black ECP) dispersed therein by kneading as dehydrated and defoamed as a whole by warming under reduced pressure, liquid MDI as a polyisocyanate component, and a curing agent comprising a mixture of 1,4-butanediol and trimethylolpropane in a weight ratio of 7:3 and containing bis(trifluoromethanesulfonyl)imidolithium dissolved therein in advance in respective amounts such that the ratio: number of moles of the hydroxyl group in the poly(ethylene butylene adipate) polyol with carbon black dispersed therein/number of moles of the isocyanato group in the polyisocyanate/number of moles of the hydroxyl group in the curing agent amounted to 1:3.2:2.1 were added in a one-shot manner and, after mixing up with stirring, the mixture was cured in a centrifugal molding machine at 130° C. for about 1 hour. Then, the molding was taken out of the centrifugal molding machine and matured at room temperature for 12 hours to give a sheet-like sample with a thickness of 2 mm. The amount of addition of bis(trifluoromethanesulfonyl)imidolithium was 70% by weight relative to that of carbon black.

EXAMPLE 5

The same compound as used in Example 1 was manually cast into a mold having a 2-mm-thick spacer and maintained at 130° C. and cured at that temperature for about 1 hour. The molding was then taken out of the mold and matured at room temperature for 12 hours to give a sheet-like sample with a thickness of 2 mm.

COMPARATIVE EXAMPLE 1

Poly(ethylene butylene adipate) polyol having an average molecular weight of 2,000 and a number of functional groups of 2 and containing the same amount as used in Example 1 of a conductive carbon black species (Ketjen black ECP) dispersed therein by kneading as dehydrated and defoamed as a whole by warming under reduced pressure, a prepolymer prepared by reacting poly(ethylene butylene adipate) polyol having an average molecular weight of 2,000 and a number of functional groups of 2 with MDI to attain an NCO content of 16%, and a curing agent comprising a mixture of 1,4-butanediol and trimethylolpropane in a weight ratio of 7:3 were weighed in respective amounts such that the ratio:number of moles of the hydroxyl group in the poly(ethylene butylene adipate) polyol with carbon black dispersed therein/number of moles of the isocyanato group in the prepolymer/number of moles of the hydroxyl group in the curing agent amounted to 1:2.7:1.6 and, after mixing up thereof with stirring, the mixture was cured in a centrifugal molding machine at 130° C. for about 1 hour. Then, the molding was taken out of the centrifugal molding machine and matured at room temperature for 12 hours to give a sheet-like sample with a thickness of 2 mm.

COMPARATIVE EXAMPLE 2

A sheet-like sample with a thickness of 2 mm was obtained in the same manner as in Comparative Example 1 except that the amount of the conductive carbon black (Ketjen black ECP) dispersed was the same as in Example 2.

COMPARATIVE EXAMPLE 3

The same compound as used in Comparative Example 1 was manually cast into a mold having a 2-mm-thick spacer and maintained at 130° C. and cured at that temperature for about 1 hour. Then, the molding was taken out of the mold and matured at room temperature for 12 hours to give a sheet-like sample with a thickness of 2 mm.

The samples obtained in Examples 1 to 5 and Comparative Examples 1 to 3 were subjected to the following evaluation tests. The results are shown in Table 1.

[Conductivity Evaluation]

Evaluation measurements were made using a resistance measuring apparatus (model R8340A, produced by Advantest Corp.).

(1) Volume Resistivity

Each sample was evaluated for volume resistivity by applying a voltage of 250 V for 30 seconds. Measurements were made at 15 sites all over the sample surface, and the arithmetic mean was reported as the volume resistivity value.

(2) Variation in Volume Resistivity

The volume resistivity values for the 15 sites as obtained in (1) were plotted on a logarithmic graph paper each scale mark of which corresponded to $1 \times 10^x$ (x represents an integer), and the variation was evaluated in terms of the difference, in number of scale marks, between the maximum and minimum value.

(3) Voltage Dependency

A voltage of 10 to 1,000 V was applied to each sample for 30 seconds, and the volume resistivity values thus obtained were plotted on a logarithmic graph paper each scale mark of which corresponded to $1 \times 10^x$ (x represents an integer), and the dependency was evaluated in terms of the difference, in number of scale marks, between the maximum and minimum value.

(4) Changes During Continuous Energization

A voltage of 100 V was applied to each sample continuously for 30 seconds, 5 minutes, 10 minutes, 15 minutes, 20 minutes, 25 minutes or 30 minutes, and resistant measurements were made at 5-minute intervals. The data obtained were plotted on a logarithmic graph paper each scale mark of which corresponded to $1 \times 10^x$ (x represents an integer), and the evaluation was made in terms of the difference, in number of scale marks, between the maximum and minimum value.

(5) Changes in the Environment

A voltage of 250 V was applied to each sample for 30 seconds in a low-temperature, low-humidity environment (10° C., 15% relative humidity) to a high-temperature, high-humidity environment (32.5° C., 85% relative humidity), and the volume resistivity were measured and plotted on a logarithmic graph paper each scale mark of which corresponded to $1 \times 10^x$ (x represents an integer). The evaluation was made in terms of the difference, in number of scale marks, between the maximum and minimum value.

TABLE 1

|  | Conductivity | | | | |
| --- | --- | --- | --- | --- | --- |
|  | Volume resistivity ($\Omega \cdot cm$) | Variation in volume resistivity | Voltage dependency | Changes during continuous energization | Changes in the environment |
| Example 1 | $1.7 \times 10^6$ | 3 marks | 7 marks | 5 marks | 10 marks |
| Example 2 | $1.1 \times 10^{11}$ | 2 marks | 5 marks | 3 marks | 8 marks |
| Example 3 | $2.2 \times 10^8$ | 5 marks | 9 marks | 6 marks | 11 marks |
| Example 4 | $9.2 \times 10^5$ | 4 marks | 8 marks | 5 marks | 11 marks |
| Example 5 | $1.4 \times 10^6$ | 4 marks | 7 marks | 4 marks | 10 marks |

TABLE 1-continued

|  | Conductivity | | | | |
| --- | --- | --- | --- | --- | --- |
|  | Volume resistivity ($\Omega \cdot$ cm) | Variation in volume resistivity | Voltage dependency | Changes during continuous energization | Changes in the environment |
| Comparative Example 1 | $7.0 \times 10^8$ | 25 marks | 60 marks | 12 marks | 30 marks |
| Comparative Example 2 | $9.4 \times 10^{11}$ | 50 marks | 60 marks | 35 marks | 25 marks |
| Comparative Example 3 | $4.3 \times 10^5$ | 15 marks | 30 marks | 11 marks | 20 marks |

Industrial Applicability

The present invention, which has the constitution described hereinabove, can provide conductive members for OA equipment which simultaneously have such characteristics as very stable electric resistance in the volume resistivity range of $10^5$ to $10^{12}$ $\Omega \cdot$cm, slight dependency of conductivity on voltage, and small changes in conductivity during continuous energization and upon changes in environmental factors such as temperature and humidity.

What is claimed is:

1. A conductive member for OA equipment, which is obtainable from a composition comprising a non-ether-based polyurethane, carbon black and bis(trifluoromethanesulfonyl) imidolithium, wherein said OA equipment is electrophotographic apparatus or electrostatic recording apparatus.

2. The conductive member for OA equipment according to claim 1, which is a conductive blade.

3. The conductive member for OA equipment according to claim 1, which is a conductive roller.

4. The conductive member for OA equipment according to claim 1, which is a conductive belt.

5. The conductive member for OA equipment according to claim 1, wherein said non-ether-based polyurethane is the product of the reaction of a non-ether-based polyol, a polyisocyanate, 1,4-butanediol and trimethylolpropane.

6. The conductive member for OA equipment according to claim 2, wherein said non-ether-based polyurethane is the product of the reaction of a non-ether-based polyol, a polyisocyanate, 1,4-butanediol and trimethylolpropane.

7. The conductive member for OA equipment according to claim 3, wherein said non-ether-based polyurethane is the product of the reaction of a non-ether-based polyol, a polyisocyanate, 1,4-butanediol and trimethylolpropane.

8. The conductive member for OA equipment according to claim 4, wherein said non-ether-based polyurethane is the product of the reaction of a non-ether-based polyol, a polyisocyanate, 1,4-butanediol and trimethylolpropane.

9. The conductive member for OA equipment according to claim 1, which is obtained by centrifugal molding.

10. The conductive member for OA equipment according to claim 2, which is obtained by centrifugal molding.

11. The conductive member for OA equipment according to claim 3, which is obtained by centrifugal molding.

12. The conductive member for OA equipment according to claim 4, which is obtained by centrifugal molding.

13. The conductive member for OA equipment according to claim 5, which is obtained by centrifugal molding.

14. The conductive member for OA equipment according to claim 6, which is obtained by centrifugal molding.

15. The conductive member for OA equipment according to claim 7, which is obtained by centrifugal molding.

16. The conductive member for OA equipment according to claim 8, which is obtained by centrifugal molding.

* * * * *